United States Patent
Defrance et al.

(10) Patent No.: US 12,401,842 B2
(45) Date of Patent: Aug. 26, 2025

(54) METHOD AND APPARATUS FOR ASSOCIATING A FIRST DEVICE WITH A SECOND DEVICE

(71) Applicant: InterDigital Madison Patent Holdings, SAS, Paris (FR)

(72) Inventors: Serge Defrance, Rennes (FR); Sylvain Lelievre, Montgermont (FR); Corinne Poree, Rennes (FR)

(73) Assignee: InterDigital Madison Patent Holdings, SAS, Paris (FR)

( * ) Notice: Subject to any disclaimer, the term of this patent is extended or adjusted under 35 U.S.C. 154(b) by 0 days.

(21) Appl. No.: 17/618,770

(22) PCT Filed: Jun. 9, 2020

(86) PCT No.: PCT/EP2020/065987
§ 371 (c)(1),
(2) Date: Dec. 13, 2021

(87) PCT Pub. No.: WO2020/249568
PCT Pub. Date: Dec. 17, 2020

(65) Prior Publication Data
US 2022/0264165 A1    Aug. 18, 2022

(30) Foreign Application Priority Data

Jun. 14, 2019 (EP) .................. 19305766

(51) Int. Cl.
*H04N 21/258* (2011.01)
*H04N 21/422* (2011.01)
(Continued)

(52) U.S. Cl.
CPC . *H04N 21/25875* (2013.01); *H04N 21/42201* (2013.01); *H04N 21/4223* (2013.01); *H04N 21/4415* (2013.01); *H04N 21/44218* (2013.01)

(58) Field of Classification Search
CPC ....... H04N 21/25875; H04N 21/42201; H04N 21/4223; H04N 21/4415; H04N 21/44218
See application file for complete search history.

(56) References Cited

U.S. PATENT DOCUMENTS 9,774,599 B2    9/2017  Seo et al.
2009/0116703 A1    5/2009  Schultz
(Continued)

FOREIGN PATENT DOCUMENTS

CN    105978880 A    9/2016
WO    2016077017 A2    5/2016
(Continued)

OTHER PUBLICATIONS

Anonymous, "Firebase Cloud Messaging", Google Developers, Internet URL: https://firebase.google.com/docs/cloud-messaging/, Mar. 29, 2019, 6 pages.
(Continued)

*Primary Examiner* — Randy A Flynn
(74) *Attorney, Agent, or Firm* — Volpe Koenig (57) ABSTRACT

According to an embodiment, a first device may receive from a second device a message comprising an authentication element and credentials associating the second device with a user identifier. The first device may obtain a set of features based on data captured by a sensor of the first device when a user is near the sensor. The first device may associate the second device with the first device on a condition that is it determined by the first device that the authentication element is verified based on a verification element, that the credentials correspond to initial credentials associating the second device with the user identifier, and that the set of features matches an initial set of features, wherein the
(Continued)

verification element, the initial credentials and the initial set of features may have been initially associated together in the first device.

16 Claims, 5 Drawing Sheets

(51) Int. Cl.
*H04N 21/4223* (2011.01)
*H04N 21/4415* (2011.01)
*H04N 21/442* (2011.01)

(56) References Cited

U.S. PATENT DOCUMENTS

| | | |
|---|---|---|
| 2011/0197267 A1 | 8/2011 | Gravel et al. |
| 2012/0297190 A1 | 11/2012 | Shen et al. |
| 2013/0176437 A1* | 7/2013 | Tseng .................... G06F 21/316 |
| | | 348/E7.085 |
| 2013/0230171 A1* | 9/2013 | Ivanchykhin ...... H04N 21/6334 |
| | | 380/255 |
| 2014/0245388 A1* | 8/2014 | Nako ................. H04L 63/0853 |
| | | 726/3 |
| 2014/0259047 A1 | 9/2014 | Bakar et al. |
| 2016/0034892 A1 | 2/2016 | Carpenter et al. |
| 2017/0346851 A1 | 11/2017 | Drake et al. |
| 2018/0109520 A1 | 4/2018 | Han et al. |
| 2018/0146374 A1 | 5/2018 | Golan et al. |
| 2018/0218139 A1 | 8/2018 | Tussy |
| 2018/0218371 A1 | 8/2018 | Wang et al. |
| 2019/0075610 A1* | 3/2019 | Ko .................... H04N 21/42204 |
| 2019/0087832 A1 | 3/2019 | Mercury et al. |
| 2019/0155743 A1 | 5/2019 | Loreskar et al. |

FOREIGN PATENT DOCUMENTS

| | | | |
|---|---|---|---|
| WO | 2018014322 A1 | 1/2018 | |
| WO | 2018083604 A1 | 5/2018 | |
| WO | WO-2018080554 A1 * | 5/2018 | ........... G06F 21/121 |
| WO | WO 2018170221 A1 | 9/2018 | |

OTHER PUBLICATIONS

English Translation for CN105978880A, entitled: The Method that Intelligent Mobile Terminal is Quickly Bound with Intelligence Fixed Terminal, dated Nov. 10, 2021.

Anonymous, "Two-Factor Authentication—Technical Details", SecSign Portal, Internet URL: https://www.secsign.com/business/two-factor-authentication/, Aug. 23, 2017, 17 pages.

Anonymous, "Use network service discovery", Android Developers, Internet URL: https://developer.android.com/training/connect-devices-wirelessly/nsd#discover, updated Oct. 27, 2021, 9 pages.

* cited by examiner

METHOD AND APPARATUS FOR ASSOCIATING A FIRST DEVICE WITH A SECOND DEVICE

CROSS REFERENCE TO RELATED APPLICATIONS

This application is a U.S. National Stage Application under 35 U.S.C. 371 of International Patent Application No. PCT/EP2020/065987, filed Jun. 9, 2020, which is incorporated herein by reference in its entirety.

This application claims the benefit of European Patent Application No. 19305766, filed Jun. 14, 2019, which is incorporated herein by reference in its entirety.

1. TECHNICAL FIELD

The present disclosure relates to the field of user and device associations.

2. BACKGROUND ART

Devices such as Television (TV) sets may usually be located in a central and visible place in the home. They are gaining more and more computing facilities. They may be good candidates for being included in home service scenarios, in addition to other devices such as, for example, smartphones or tablets. Smartphones may be associated with a user through the smartphone unlock process. Applications involving together a TV-set and a smartphone for a specific user are now emerging. The present disclosure has been devised with the foregoing in mind.

3. SUMMARY

According to an embodiment, a method for associating a first device with a second device is described herein. According to an embodiment, the first device may receive from the second device a message (e.g., an information element) comprising an authentication element and credentials associating the second device with a user identifier. According to an embodiment, the first device may obtain a set of features based on data (e.g., any of an image, a voice record, . . . ) of a user, captured by a sensor (e.g., any of a camera, a microphone, . . . ), when a user is near the sensor. According to embodiments, the first device may associate the second device with the first device on a condition that is it determined by the first device that the authentication element is verified based on a verification element, that the credentials correspond to initial credentials associating the second device with the user identifier, and that the set of features matches an initial set of features, wherein the verification element, the initial credentials and the initial set of features may have been initially (e.g., previously) associated together in the first device.

It should be understood that the drawing(s) are for purposes of illustrating the concepts of the disclosure and are not necessarily the only possible configuration for illustrating the disclosure.

5. DESCRIPTION OF EMBODIMENTS

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the term "interconnected" is defined to mean directly connected to or indirectly connected with through one or more intermediate components. Such intermediate components may include both hardware and software based components. The term "interconnected" is not limited to a wired interconnection and also includes wireless interconnection.

All examples and conditional language recited herein are intended for educational purposes to aid the reader in understanding the principles of the disclosure and the concepts contributed by the inventor to furthering the art and are to be construed as being without limitation to such specifically recited examples and conditions.

Moreover, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

It is to be appreciated that the use of any of the following "1", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

In addition, it is to be understood that the figures and descriptions of the present disclosure have been simplified to illustrate elements that are relevant for a clear understanding of the present disclosure, while eliminating, for purposes of clarity, many other elements found in typical digital multimedia content delivery methods, devices and systems. However, because such elements are well known in the art, a detailed discussion of such elements is not provided herein. The disclosure herein is directed to all such variations and modifications known to those skilled in the art.

The present disclosure relates to association between at least two devices and a user. For the sake of clarity, a first and a second device are described herein as respectively a TV set and a smartphone, but the first and the second devices may be any kind of processing device capable of interaction (e.g., providing interaction functions) with a user. For example, the first device may be a (e.g., any of a laptop, desktop) computer.

Smartphones may be associated with a user, for example, through the smartphone unlock process. The unlock process may be personalized by any of entering a (e.g., secret) code, a fingerprint recognition and a face recognition. A successful smartphone unlocking through a (e.g., dedicated) process, may indicate that the smartphone has recognized (e.g., identified) a user. Applications involving together a TV-set and a smartphone for a specific user are emerging. For example, mixed or augmented reality applications may involve a smartphone as a second screen. Examples of applications using a preliminary user association (e.g., identification) to the TV-set, may include any of a call continuation service from smartphone to TV-set, security applications involving a front door unlock process, social media applications, elder care applications. . . . An example of combined use of a smartphone and a TV-set for authentication, not using a preliminary specific association between the two devices may be a two-factor authentication system where part of the information during an authentication process of a user by a TV-set may be transmitted through the smartphone. Another example of such combined use of a smartphone and a TV-set may include visa transactions on a web site using an additional code to complete, where the additional code may be transmitted to a smartphone. Examples of association processes between a user and one device, or between two devices, may include the flashing of a two-dimensional code (QR-code) by the smartphone to get the (e.g., necessary) information to connect the TV-set.

An association process between a first device (e.g., a TV-set) and a second device (e.g., a smartphone) is described herein. According to an embodiment, the association process may comprise the occurrence of, for example, up to three bilateral association steps. In a first association step, in case the smartphone is locked, the user may unlock the smartphone. A smartphone may be unlocked by any conventional method, such as, for example, any of entering a code, a pattern drawing, a fingerprint recognition (e.g., touch ID). In a second association step, the unlocked smartphone may send an information element representative of the smartphone and of a user identifier to the TV-set, such as, for example, (e.g., specific, authenticated) credentials. In a third association step, the TV-set may recognize (e.g., identify) the user based on a user identification method. Any user identification method may be applicable to embodiments described herein. For example, the TV-set may obtain a set of features based on (e.g., biometric) data of a user captured by a sensor (e.g., coupled to the TV set), when the user in in proximity of the sensor. The TV set may identify the user based on an user identification method, e.g., via a matching of the set of features to an initial set of features that may have been preliminary recorded in the TV set in association with the user (e.g., identifier). For example, the TV-set may record an initial set of (e.g., user) features during an initial (e.g., preliminary) association. For example, the identification method may be based on (e.g., biometrics) data. For example, biometrics data may include any data representative of any of a face, a voice, a gesture of the user. For example, a user identification method may use a corresponding (e.g., face/voice/gesture) recognition system attached to the TV-set. In a face recognition example, user features may be extracted from any number of pictures of the user. The picture(s) may be captured during any of the initial (e.g., preliminary) association and the subsequent association by any capturing means (e.g., any of a sensor, a camera) coupled (e.g., integrated) to the TV-set. In a voice recognition example, user features may be extracted from e.g., a user voice record. For example, the user may be invited to say any number of words, or e.g., a complete sentence. In a variant, user identification may be based on gesture recognition: the user may be invited to execute a specific gesture in front of the TV-set. In a gesture recognition example, user features may be any data characterizing (e.g., representative of) the gesture executed by the user. In yet another variant, the identification method may be any combination of several recognition methods, e.g., gesture and face recognition.

According to an embodiment, the association process may be based on an initial (e.g., preliminary) association between a user, the smartphone, and the TV-set. The initial association process (e.g., that took place preliminary to the association process) will also be described herein.

According to an embodiment, the (e.g., specific, authenticated) credentials transmitted by the smartphone in the second association step may be registered in the smartphone and the TV-set. The credentials may be representative of (e.g., specific, unique for) this smartphone. The credentials may also be representative of (e.g., specific, unique for) a user identifier. For example, the credentials may associate the smartphone with the user identifier. According to an embodiment, initial credentials, associating the smartphone with the user identifier may have been shared between the TV-set and the smartphone during an initial (e.g., preliminary) association. For example, the initial credentials may have been transmitted by the TV-set to the smartphone during the initial association process. In another example, the initial credentials may have been transmitted by the smartphone to the TV-set during the initial association process. In addition, the TV-set may be able to authenticate the messages received from the smartphone according to an identification (e.g., verification) element, transmitted by the smartphone to the TV-set, for example, during the initial association process.

According to an embodiment, the association process may occur many times, and the initial association process may take place (e.g., only) once, when the user, the smartphone and the TV-set may initially be associated. According to an embodiment the three elements involved in the initial association may be gathered in the same place, for example, inside a home in front of the TV-set.

According to an embodiment, the initial association method may comprise four steps. In a first (e.g., discovering) step, the user may initiate the initial association process by launching an (e.g., association) application on the smartphone which may discover through conventional methods, such as for example network service discovery, which TV-sets may be available for association.

In a second (e.g., contacting) step, the user may select, for example through the (e.g., association) application, the TV-set to associate with. In response to a smartphone request, the TV-set may deliver (e.g., generate) association information in two pieces, a first piece directed (e.g., transmitted) to the smartphone, a second piece displayed on the TV-set screen.

In a third (e.g., gathering credential) step, the user may enter in the smartphone the part of the credentials displayed on the TV screen (e.g., the second piece of the association information generated by the TV-set). The credentials may be representative of the smartphone and its associated user. In other words, they represent an identification element for both the smartphone and its associated user. The credentials and may allow to associate a smartphone with a user (e.g., identifier). According to an embodiment, both parts (e.g., the first piece and the second piece of association information) may be sent by the smartphone to the TV-set for completing their association. According to an embodiment, the smartphone may transmit to the TV-set a verification element, that may be used to authenticate the smartphone's messages during the association process. The verification element may be, for example, a public key used to verify signatures.

In a fourth (e.g., user association) step, the user may validate a set of features, for example, obtained based on data captured by a sensor coupled to the TV-set. The validation of the set of features may be performed via a direct interaction with a TV-set or via the smartphone, for example, through the (e.g., association) application. An initial set of features may have been recorded by the TV-set e.g., during the initial association for his or her further identification. Any of the set of features and the initial set of features may be extracted based on any of biometrics data (e.g., face picture, voice record), gesture data, and any other data, which a user identification system of the TV-set may rely on.

For example, the TV-set may display an image of the user whose features may have been recorded, so that the user may validate them by recognizing his or herself.

The initial association process is based on a physical colocation of the three parties (user, smartphone and TV-set). A physical colocation may be for example a same physical place (e.g., in front of the TV-set), and/or a restricted access area (e.g., a home). An initial association of three physically collocated parties may allow to reinforce the confidence a user may have in the association process liability, for example, in terms of identification. The association process may be used in various use cases, for example sensitive to safety and security, as unlocking the front door of a home.

Association Process

Figure 1:
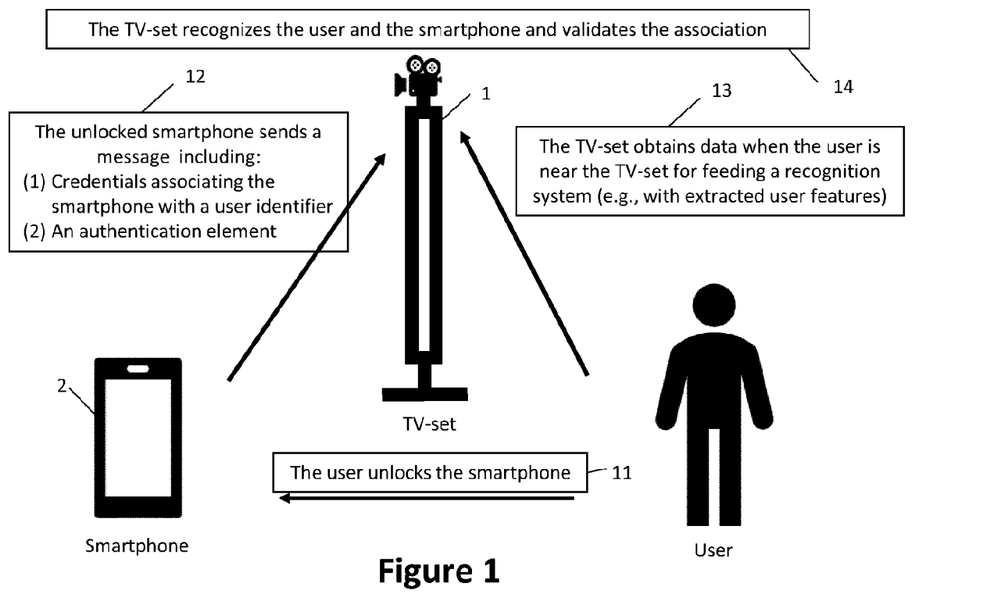
FIG. 1 is a diagram illustrating an example of a method for associating a first device with a second device.

FIG. 1 is a diagram illustrating an example of a method for associating a first device (e.g., TV-set) 1 with a second device (e.g., smartphone) 2. According to an embodiment, the method may comprise three bilateral association steps 11, 12, 13 occurring in a (e.g., short, bounded) period of time. The duration of the period of time may depend on several elements, such as any of a network velocity, safety and security requirements . . . ). For example, the period of time may be less than one or two minutes.

According to an embodiment, the association process may be initiated by any of the user, the smartphone 2 and the TV-set 1. In an optional step 11, in case the smartphone 2 is locked, the user may unlock the smartphone 2, using a conventional method such as any of entering a code, drawing a pattern, recognizing a fingerprint (e.g., touch ID). According to an embodiment, an (e.g., association) application may be launched (e.g., by the user) on the smartphone 2. According to an embodiment, a solicitation may be generated (e.g., displayed) by the smartphone 2 to initiate an association validation process, and validated by the user.

According to an embodiment, in a step 12 the smartphone 2, (e.g., once unlocked) may send (e.g., transmit at an address) a message to the TV-set 1. According to an embodiment, the message may include an authentication element, and credentials associating the smartphone with a user identifier. For example, the credentials may include any information element (e.g., any of a PIN code, a drawn pattern, a recognized fingerprint) used by the user to unlock the smartphone 2. For example, the authentication element may allow the TV-set 1 to determine whether the message may be trusted.

For example, the message to the TV-set 1 may include an information element representative of the smartphone 2 and of the user. The information element may for example include a first information element representative of the smartphone 2 and a second information element representative of a user identifier. A (e.g., first) information element representative of the smartphone 2 may be, for example, an authentication element, allowing the TV-set 1 to recognize the smartphone. A (e.g., second) information element representative of the user may be e.g., any kind of information preliminary known by the TV-set 1 and identifying the user. For example, the (e.g., second) information element may comprise information (e.g., credentials) associating the smartphone 2 with the user identifier. The information, preliminary known by the TV-set 1, identifying the user in association with the smartphone 2 may have been transmitted to the smartphone 2 by the TV-set 1, for example, during the initial association phase, and may be referred to herein as initial credentials.

The (e.g., message) authentication element may be, for example, a signature of the smartphone message, which the TV-set 1 may verify according to a verification element (e.g., a public key). The verification element (e.g., public key) may have been transmitted by the smartphone 2 to the TV-set 1, for example, during the initial association phase.

According to an embodiment, the address of the TV-set may be specific as the TV-set may implement a specific server for the reception of smartphone message within the association process. The specific address may have been transmitted to the smartphone by the TV-set during the initial association phase.

According to an embodiment, the TV-set 1, having received and authenticated the message of the smartphone 2, may be able to check that the user who may be in front of its sensor (e.g., microphone, camera) may be the one which is associated with the credentials the TV-set 1 received from the smartphone 2. According to an embodiment, the TV-set 1 may use a recognition server, which may be local (e.g., embedded in the TV-set 1) or distant (e.g., located in the cloud). The TV-set 1 may feed the recognition server with a set of (e.g., user's) features, for example, extracted from data captured by the sensor when the user is near the TV set 1. For example, the set of features may be extracted from any number of (e.g., 2D, 3D) pictures of the user in case where the user identification system of the TV-set is using a face recognition method. According to an embodiment, the data (e.g., picture(s), audio) from which user's features may be extracted, may be provided from a trusted sensor (e.g., camera, microphone). By a trusted sensor (e.g., camera, microphone) it is meant a sensor (e.g., camera, microphone) which is part of the TV-set eco-system. It may be a built-in sensor which may require the user to stand in front of the TV-set. It may also be a front-door sensor (e.g., camera, microphone) (e.g., a sensor located at the front door of the home and interconnected with the TV-set via a network). It may also be a sensor (e.g., camera, microphone) of the smartphone. According to an embodiment, the data delivered by the sensor may be analysed by the recognition system of the TV-set. According to an embodiment, the set of (e.g., user) features may be provided by a trusted sensor, or more generally, by any trusted device able to retrieve the appropriate set of (e.g., user) features.

According to an embodiment, in a step 14, the TV-set 1 may associate (e.g., validate the association of) the TV-set 1 with the smartphone 2 (and the user) on a condition that it is determined by the TV-set 1 that the information element is associated with the second device and that the set of features (e.g., extracted from any of an image and a voice record) of the user is associated with the user identifier. More precisely, the association of the TV-set 1 with the smartphone 2 (e.g., and the user) may be validated on a condition that it may be determined by the TV-set 1 that the authentication element may be verified based on a verification element, that the credentials may correspond to initial credentials associating the second device with the user identifier, and that the set of features may match an initial set of features, wherein the verification element, the initial credentials and the initial set of features may have been initially associated together in the TV set 1 in e.g., an initial association.

The TV-set may for example compare the set of (e.g., user's) features extracted from data (e.g., any of an image and a voice record) of the user that may have been captured by the sensor (e.g., camera, microphone), with an initial set of (e.g., user's) features that were initially registered (e.g., stored) in the TV-set during the initial association, and initially associated with the user identifier. If the set of (e.g., user's) features extracted from the captured data (e.g., image, voice record) of the user match initially registered user's features associated with a user identifier, and if that user identifier corresponds (e.g., matches, is associated with) the credentials received from the smartphone, the TV-set may recognize the user and the smartphone and may validate (e.g., complete, terminate) the association.

Initial Association Process

The initial association process is described herein. For the sake of clarity and without loss of generality, it is considered that an (e.g., initial association) application may be running on the smartphone and an (e.g., initial association) service (e.g., application) may be running on the TV-set. The present disclosure is not limited to those specific applications/services and is equally applicable to devices performing the described steps as part of their embedded processing firmware.

Figure 2:
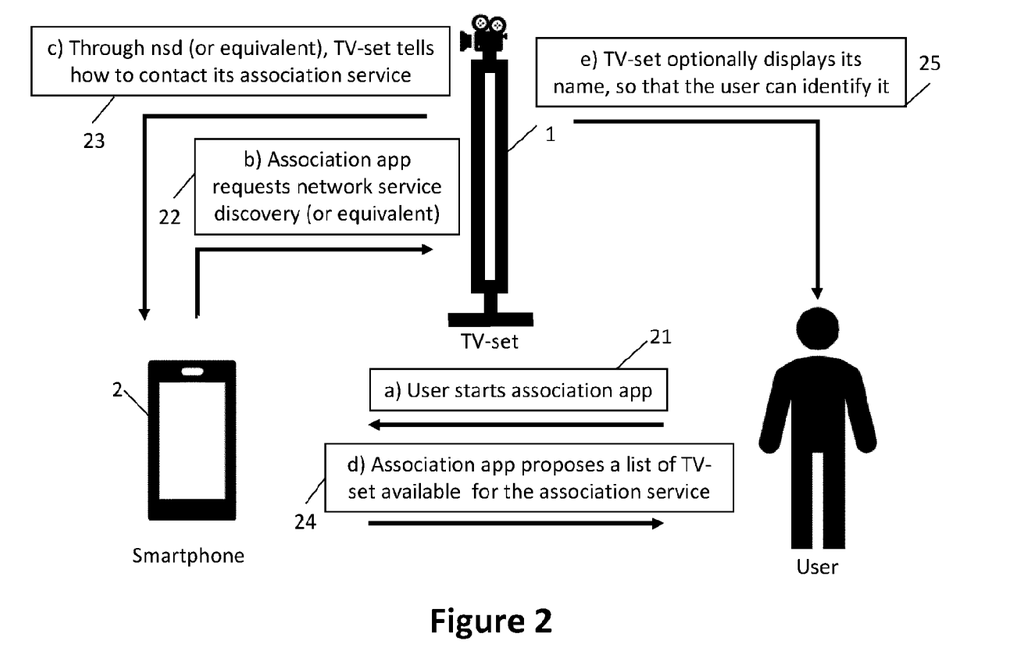
FIG. 2 is a diagram illustrating an example of a first (e.g., discovering) step of an initial association method.

FIG. 2 is a diagram illustrating an example of a first (e.g., discovering) step of an initial association method, allowing a user to discover a TV-set 1 available for association with a smartphone 2. In a step 21 an (e.g., initial association) application may be started by a user on the smartphone 2. The user may be standing in front of the TV-set. In a step 22, the (e.g., initial association) application may use a network discovery service (or any equivalent technique) to learn (e.g., discover) which TV-sets are available for association and how to contact the association service on the TV-set in a step 23. The (e.g., initial association) application may propose the user to contact the (e.g., initial association) service on the TV-set in a step 24 and the initial association process may move forward to the second (e.g., contacting) step.

According to an embodiment, if several association services (e.g., several TV-sets) are discovered, the user may select one of them. For example, the selection may be based on the service name (e.g., "TV-set of the living room", . . . ) which the TV-set may transmit to the smartphone through the network discovery service (or equivalent). The TV-set may also display on its screen its name (or service name) in a step 25, so that the user may identify the TV-set which he/she may be standing in front of.

Figure 3:
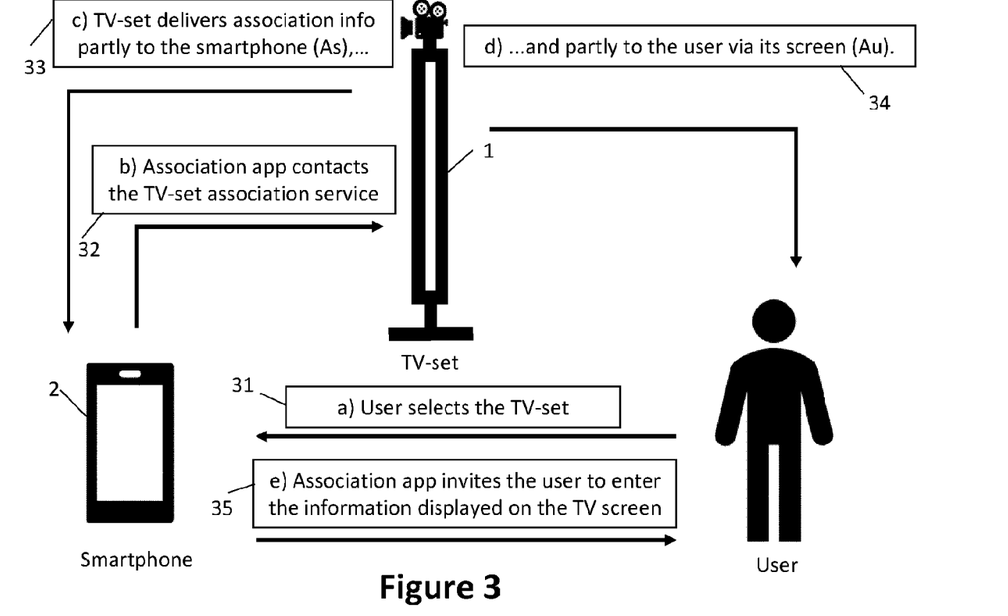
FIG. 3 is a diagram illustrating an example of a second (e.g., contacting) step of an initial association method.

FIG. 3 is a diagram illustrating an example of a second (e.g., contacting) step of an initial association method, allowing a user to select a TV-set 1 which may respond by transmitting association information, for example, in two pieces. According to the illustrated example, in a step 31, the user may accept the proposal of the (e.g., initial association) application to contact the discovered (e.g., initial association) service on the TV-set 1. In a first example, the (e.g., appropriate) device may be selected on the smartphone 2 according to the TV-set name which may, for example, have been displayed on the TV-screen. In another example, the TV-set 1 may (e.g., shortly, during a period of time of a few seconds) display a confirmation message in case the TV-set 1 has been selected on the smartphone 2 (and the smartphone 2 has transmitted an indication to the TV-set 1 that is has been selected). If no message is displayed by the TV-set 1, the user may infer that he/she did not select the (e.g., appropriate) service and may move to (e.g., select) the next one in the proposed list.

According to an embodiment, in a step 32, the (e.g., initial association) service in the TV-set 1 may receive a message from the (e.g., initial association) application of the smartphone, requesting an initial association. From this message, the TV-set 1 may generate (e.g., derive) association information, which may identify the smartphone requesting the association and its associated user. The association information, besides identification elements of the smartphone and its associated user, may include information for the smartphone to complete the association process. The TV-set 1 may generate two parts (e.g., pieces) of association information. The TV-set 1 may answer to the (e.g., initial association) application and to the user by, for example, transmitting the first part of the association information to the smartphone (e.g., initial association application) in a step 33 and by displaying the second part of the association information in a step 34. The first part (transmitted to the smartphone) is denoted As on FIG. 3 (A standing for association information and s for smartphone). The second part, denoted Au (u standing for user), may by directly sent to the user by being displayed on the TV-set screen.

Partitioning the association information in two parts and displaying one of them may allow to ensure that the user stands in front of the TV-set to get the piece of information. It also may allow to provide an active participation of the user for entering this piece of information in the smartphone in a step 35. This last operation is further detailed herein.

Figure 4:
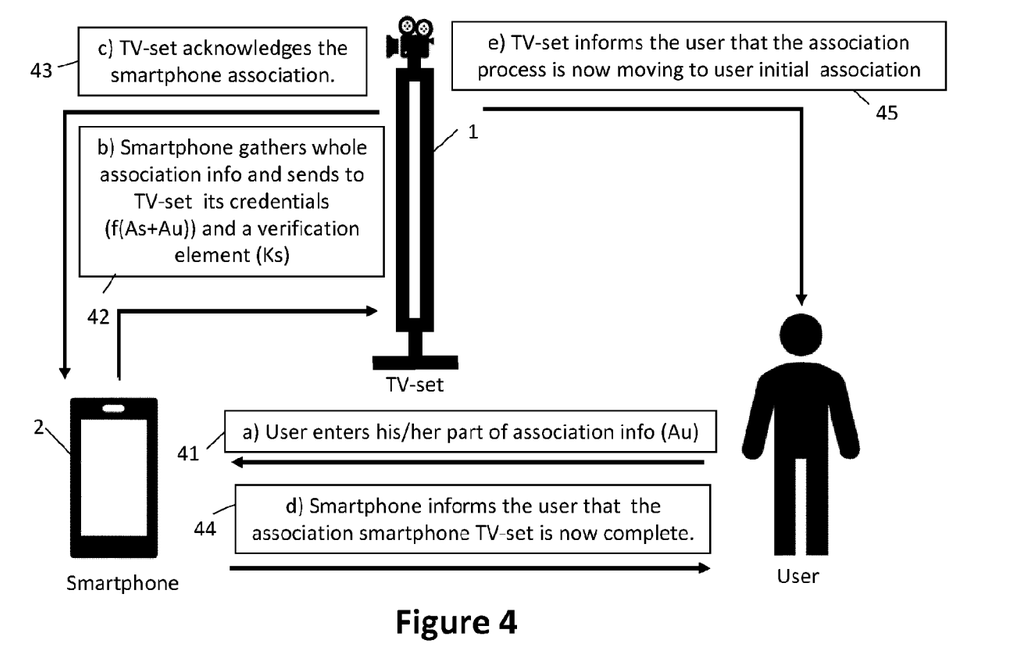
FIG. 4 is a diagram illustrating an example of a third (e.g., gathering credentials) step of an initial association method.

FIG. 4 is a diagram illustrating an example of a third (e.g., gathering credentials) step of an initial association method, allowing the smartphone 2 to gather association information and to complete its initial association process. The TV-set 1 may accept the smartphone initial association (e.g., only) if it receives the (e.g., appropriate) initial credentials. In a step 42, the (e.g., appropriate) initial credentials may be computed by the smartphone 2, for example, through a function f based on the association information (e.g., As+Au), including the piece of association information entered by the user in the smartphone (Au) in a step 41, which may be deduced from the piece of association information displayed on the TV screen (e.g., in the step 34). Any function f able to generate an output value based on two input values may be used to compute the initial credentials. According to an embodiment, the TV-set 1 may know the function f (e.g., the function f may be stored in the TV-set 1 preliminary to the initial association). In a step 43, the TV set 1 may verify the initial credentials sent by the smartphone and may acknowledge the smartphone association by sending an acknowledgment message to the smartphone 2. The smartphone initial credentials are denoted herein f(As+Au). They allow to identify the smartphone and the user associated to the smartphone.

In the step 42, the smartphone may send an initial message including the initial credentials and a verification element. For example, in addition to the initial credentials, the (e.g., complete) answer transmitted by the smartphone 2 to the TV-set 1 may include a (e.g., message) verification element (as a public key for instance). The TV-set 1 may authenticate messages from the smartphone 2 in the future exchanges during the (e.g., subsequent) association process according to the verification element, denoted herein Ks (K standing for key, and s for smartphone).

According to an embodiment, the piece of information entered by the user in the smartphone (e.g., Au) in the step 41 may be, for example, a (e.g., couple of digits) code entered via the keyboard/touch screen of the smartphone. According to an embodiment, the piece of information may be a two-dimensional code (e.g., a quick response (QR) code) or a specific picture that may be flashed by the smartphone. According to an embodiment, the entered piece of information may be based on picture recognition by the user (for instance, by typing the picture's number with no animal).

According to an embodiment, in a step 44, the smartphone 2 may display an indication informing (e.g. the user) of a first completion of the initial association of the smartphone with the TV set 1.

According to an embodiment, in a step 45, the TV set may display an indication informing (e.g. the user) that the initial association may move to the user initial association.

According to an embodiment, the association information may include any of connection information (e.g., IP address and port) to access an association service, identification elements (e.g., including any of a login-password, International Mobile Equipment Identity (IMEI). The second part of the association information, which may be displayed on the TV-screen and which the user may enter in the smartphone in this step (Au) may include any element of the association information. The second part of the association information may include any of a part of the IP address, a part of a port number, a part of a login or a password for a further connection.

Figure 5:
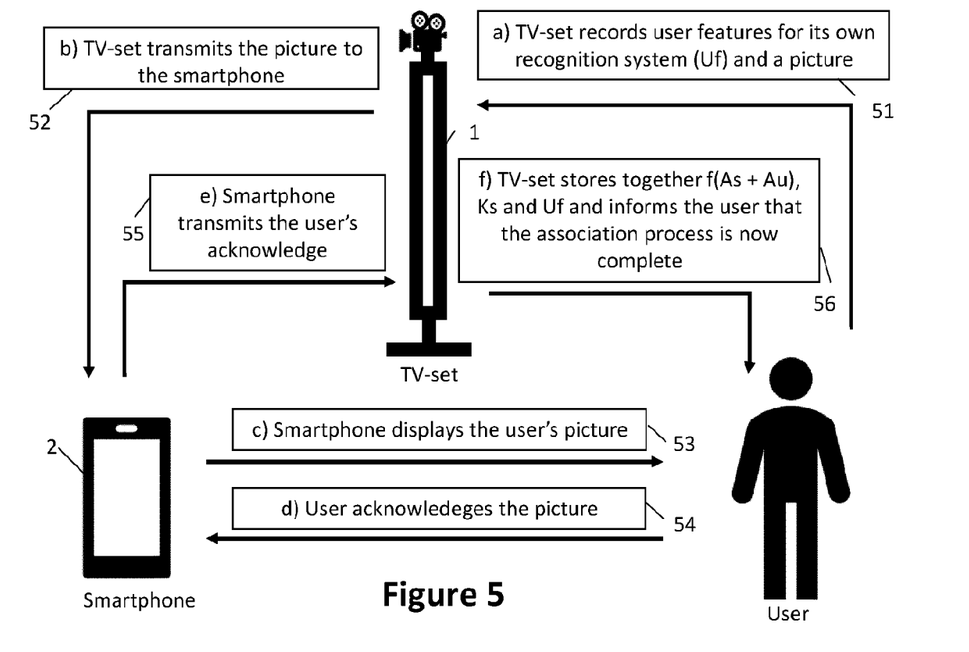
FIG. 5 is a diagram illustrating an example of a fourth (e.g., user association) step of an initial association method.

FIG. 5 is a diagram illustrating an example of a fourth (e.g., user association) step of an initial association method, allowing the TV-set to associate the user (e.g., a user identifier) with an initial set of (e.g., user's) features for the user identification system of the TV-set to be able to recognize him/her during the (e.g., subsequent) association process. The initial set of (e.g., user's) features are denoted herein Uf. The initial set of features may include features of different types depending on the recognition method (e.g., implemented by the user identification system) of the TV-set 1. As already mentioned, several methods may be applicable to embodiments described herein. For example, video features may be extracted from any number of pictures of the user and an initial set of video features may be matched to a subsequent set of video features based on a face recognition system. In another example, audio features may be extracted from e.g., a voice record of the user and an initial set of audio features may be matched to a subsequent set of audio features based on a voice recognition system. In another example, gesture features may be extracted from data captured by a sensor while the user is accomplishing a gesture in proximity of the sensor. The sensor may be any of a camera and a radar sensor. An initial set of gesture features may be matched to a subsequent set of gesture features based on a gesture recognition system. According to an embodiment, the TV-set 1 may store the initial set of (e.g., user's) features (e.g., any data relevant for the recognition system).

According to an embodiment, (e.g., in addition to the acquisition of the initial set of features), the TV-set 1 may be optionally configured to take (e.g. and display) a picture of the user. Taking (e.g. and displaying) a picture of the user may allow the user to recognize his or herself and to validate the recorded (e.g., acquired) initial set of features. According to an embodiment, the smartphone may be used to acknowledge or not a picture of a user (whose features may have been recorded). For example, in case several users may stand in front of the TV-set, the TV-set may take a picture of the group of users and a set (e.g., list) of different pictures (e.g., one per user) may be generated for display e.g., on any of the smartphone and the TV set). The set (e.g., list) of different pictures of different users may be browsed by the user (e.g., on the smartphone) and a picture may be selected. This process may allow the acknowledgement by the user of the initial set of features recorded by the TV-set, e.g., in case of several users standing in front of the TV-set.

Referring to FIG. 5, in a step 51, the TV set 1 may acquire (e.g., record) a set of initial features of the user based on data (e.g., any of a picture, a voice record, . . . ) captured when the user in in proximity of the TV set 1. For example, the TV set 1 may also capture a picture of the (e.g., group of) user standing in front of the TV set. In a step 52, in case the picture comprises several users, the TV set 1 may transmit a picture of a (e.g., single) user to the smartphone 2. In a step 53, the smartphone 2 may display the picture of the (e.g., single) user. If the user recognized him/herself in the displayed picture, he may acknowledge the picture in a step 54, and the smartphone 2 may forward the acknowledgement to the TV set 1 in a step 55. If the user does not recognize him/herself in the picture, the user may request the display of a further picture in the set (e.g., list) of pictures (not represented). According to an embodiment, in a step 56, the initial set of features Uf may be stored together (e.g., in association with) the credentials f(As+Au) and the verification element Ks.

Figure 9:
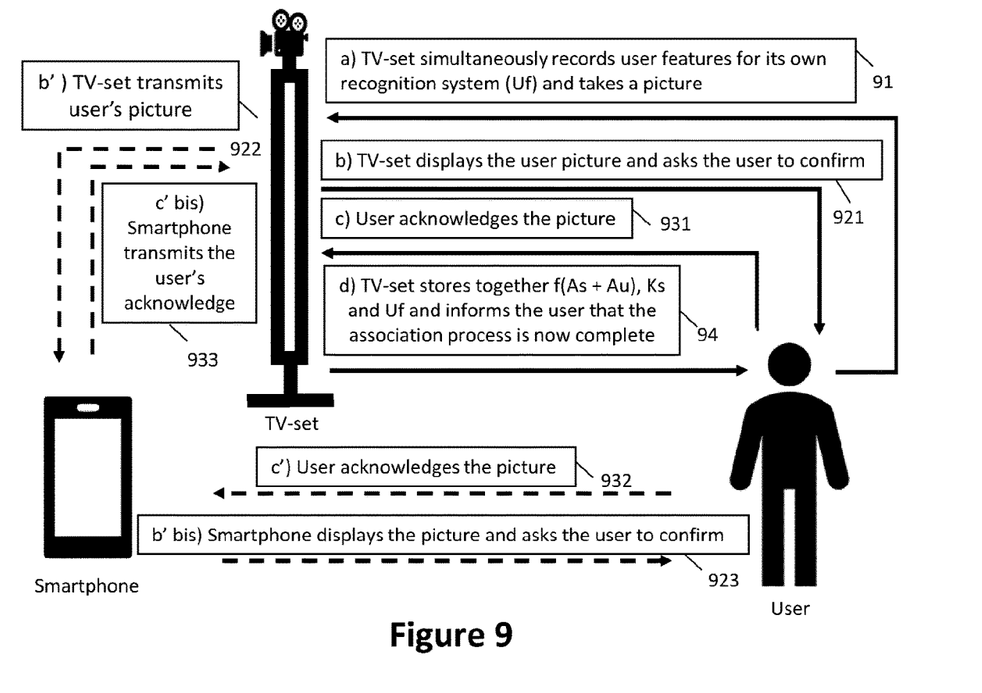
FIG. 9 is a diagram illustrating another example of the fourth (e.g., user association) step of the initial association method.

FIG. 9 is a diagram illustrating an alternative example of the fourth (e.g., user association) step of an initial association method allowing the TV-set 1 to associate the user (e.g., a user identifier) with an initial set of (e.g., user's) features. in a step 91, the TV set 1 may acquire (e.g., record) a set of initial features of the user based on data (e.g., any of a picture, a voice record, . . . ) captured when the user in proximity of the TV set 1. For example, the TV set 1 may also capture a picture of the (e.g., group of) user standing in front of the TV set 1. In a step 922, in case the picture comprises several users, the TV set 1 may transmit a picture of a (e.g., single) user to the smartphone 2. In a step 923, the smartphone 2 may display the picture of the (e.g., single) user. If the user recognizes him/herself in the displayed picture, he may acknowledge the picture in a step 932, and the smartphone 2 may forward the acknowledgement to the TV set 1 in a step 933. According to an embodiment, instead of using the smartphone 2 to display the different pictures of the different users, the TV set 1 may display a picture of a (e.g., single) user in a step 921 and may request the user to confirm (e.g., acknowledge). If the user recognizes him/herself in the displayed picture, he may acknowledge the picture in a step 931. If the user does not recognize him/herself in the picture, the user may request the display of a further picture in the set (e.g., list) of pictures (not represented). According to an embodiment, in a step 94, the initial set of features Uf may be stored together (e.g., in association with) the credentials f(As+Au) and the verification element Ks.

In yet another example of the fourth (e.g., user association) step of the initial association method (not represented), the TV set may not take any picture of the user whose initial set of features may be recorded in the TV set. For example, the initial set of features may be recorded in the TV set after the corresponding data (e.g., any of a picture, a voice record, a gesture, . . . ) of the user may have been acquired (e.g., captured) by the sensor.

According to an embodiment, in case there is no sensor (e.g., any of a camera, a microphone . . . ) embedded in the TV-set, a corresponding sensor (e.g., the camera, the microphone, . . . ) of the smartphone may be accessed (e.g., controlled) by the TV-set (e.g., via a network), and the user may be asked to turn the smartphone sensor (e.g., camera, microphone) close to his/her face. For example, the TV set may control the smartphone to capture data (e.g., picture, voice record) of the user via a smartphone sensor (e.g., camera, microphone, . . . ) and to transmit the captured data to the TV set. The user may also be asked, (e.g., besides showing his/her face), to put the camera of the smartphone in front of the TV-set screen which may display a specific picture (typically a two-dimensional code), so that the smartphone may capture pictures of the TV-set screen and transmit the captured pictures to the TV-set over the network. The TV-set, receiving those pictures from the smartphone over the network, and detecting the picture displayed on its screen through the smartphone camera, may check (e.g., verify) that the user is effectively standing in front of it.

According to an embodiment, the TV-set may receive an indication (e.g., from the user) selecting at least one picture. Features (Uf) corresponding to the selected user may be stored, (e.g., concurrently with, in association with) the credentials (f(As+Au)) of the smartphone recorded at the third initial association step. According to an embodiment, during a (e.g., subsequent) association process, further user's features (Uf') may be extracted from a further captured data (e.g., any of an image, a voice record a gesture) of a user. Uf and Uf' may be processed by (e.g., any of a face, voice, gesture, . . . recognition system attached to) the TV to check whether the user requesting a subsequent association process is the same user as the user who performed the initial association process. Any recognition system may be used, located in any of the TV-set, another device located inside the home, or outside the home (e.g., connected to the cloud).

According to an embodiment, the third and the fourth steps which have been described sequentially may also be performed concurrently (e.g., in parallel, simultaneously).

According to an embodiment, after completion of the initial association process, the smartphone may have recorded a TV-set address and credentials (f(As+Au), for example, built during the gathering of the two parts of the association information) to access the TV-set validation service. The TV-set may have recorded, for example, in association with a user identifier, a set of (e.g., user) features, (Uf) (e.g., information to be processed by the TV-set recognition system to recognize a user), the credentials of the associated smartphone (f(As+Au)), and the verification element (Ks). The set of features, the credentials and the smartphone identification element recorded in the TV set in the initial association process may be referred to herein as respectively the initial set of features, the initial credentials.

According to an embodiment, the initial set of features, the initial credentials, and the (e.g., message) verification element may be pre-recorded in the TV set. For example, the TV set may be pre-configured by the TV manufacturer (e.g., or retailer) with the initial set of features, the initial credentials, and the verification element, when the user acquired the TV set. In another example the TV set may be pre-configured by with the initial set of features, the initial credentials, and the verification element by downloading the corresponding information from a (e.g., trusted) server.

According to an embodiment, front doors may be equipped with a sensor (e.g., any of a camera, microphone, . . . ) connected to a TV-set recognition system. Systems, where a front door may be unlocked based only on a (e.g., face, voice) recognition process may be misled (e.g., fail), if a fake user (e.g., face, voice) is presented to the sensor (e.g., camera, microphone). The association process described herein may allow to avoid this type of malfunction. Sending a confirmation via the associated smartphone when the associated user is recognized in front of the front door may allow to increase the security of the process. The association process cannot be misled by presenting a fake user (e.g., face, voice) to the camera.

Figure 6:
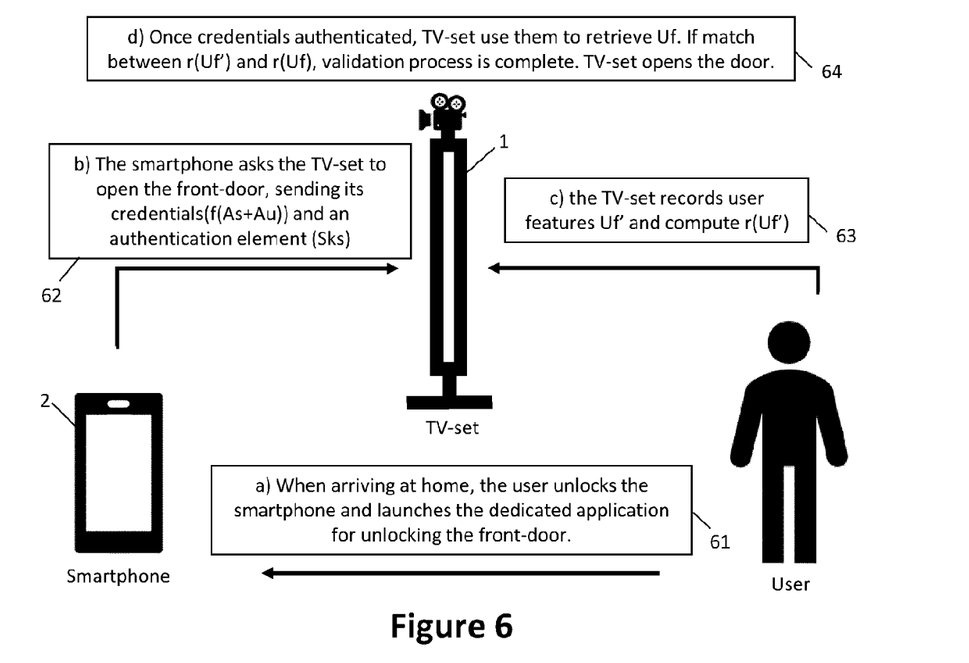
FIG. 6 is a diagram illustrating an example of a front door opening application.

FIG. 6 is a diagram illustrating an example of a front door opening application using the association method described herein. FIG. 6 illustrates an association process, occurring after an initial association process involving the same three entities preliminary occurred.

According to an embodiment, when arriving at home, in a step 61, a user may unlock the smartphone, (e.g., bilateral first association step) and may launch a (e.g., front-door unlocking) application on the smartphone 2. In a step 62, the application may contact (e.g., transmit a message to) the TV-set 1 with (e.g., including) its credentials (f(As+Au)) and a (e.g., message) authentication element (e.g., bilateral second association step). The authentication element may be verified according to the verification element transmitted during the initial association process. The (e.g., message) authentication element may be a signature on the message or part of the message (e.g., the credentials) which the smartphone 2 may send to the TV-set 1. For example, to verify the signature, the TV-set 1 may use the public key (Ks) which the smartphone 2 may have transmitted to the TV-set 1 during the third step of the initial association process. The authentication element is denoted herein Sks (S stands for signature and ks for key smartphone) reflecting the fact that the signature may be verified thanks to a public key Ks).

According to an embodiment, the TV-set 1, receiving such a message from the smartphone, may authenticate the received credentials. The TV-set 1 may check whether the user associated with the received credentials may be recognized according to the features Uf' obtained (e.g., extracted), in a step 63, from a data (e.g., any of a picture, a voice record, . . . ) captured (e.g., and transmitted) by a front-door sensor (e.g., any of a camera, a microphone . . . ). The TV-set 1 may, for example, use the recognition function of its recognition system, denoted "r" herein for comparing the obtained user features Uf' with initial user's features Uf obtained during the initial association as previously described. In the step 64, if it is determined by the recognition system that the obtained user's features Uf' and the initial user's features Uf correspond to a same user (e.g., r(Uf)=r(Uf')), the TV-set 1 may validate (e.g., complete, successfully terminate) the association between the TV-set 1 and the smartphone 2, and a subsequent process may be performed, such as for example opening the front-door.

Opening a front door is an example of a subsequent process that may be performed (e.g., triggered) upon a successful completion of an association process as described herein. Any other kind of processing that may be triggered upon a successful authorization, verification is compatible with the present disclosure.

According to an embodiment, the front door may not be equipped with a sensor (e.g., any of a camera, a microphone, . . . ). The TV-set 1 may have access to a sensor (e.g., any of a camera, a microphone) of the smartphone 2 (via e.g., a network). For example, the user may be asked to show his/her face via the camera for collecting user's features Uf' and transmitting them to the TV-set 1. In another example the user may be asked to pronounce a sentence (e.g., generate a voice record) closed the microphone for collecting user's features Uf' and transmitting them to the TV-set 1. According to an embodiment, the TV-set 1 (e.g., recognition system) may also ask the user to show the front door via the camera of the smartphone (a picture of which may be taken and compared to a preliminarily recorded picture of the same front door).

Figure 7:
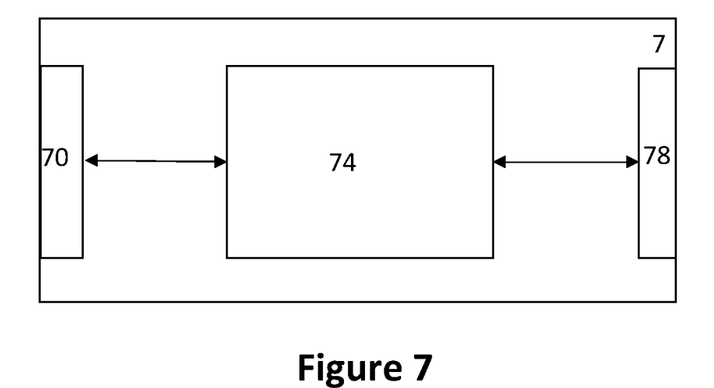
FIG. 7 illustrates a processing device 7 for associating the processing device 7 with a second device according to an embodiment.

FIG. 7 illustrates a processing device 7 for associating the processing device 7 with a second device according to an embodiment. The processing device 7 may comprise at least one network interface 70 for receiving an information element representative of the second device and of a user identifier. For example, the network interface 70 may be configured to receive a message comprising an authentication element and credentials associating the second device with a user identifier. According to embodiments, the network interface may be any of a cellular (e.g., 2G/3G/4G/5G) interface, a local area network interface (e.g., any of Wi-Fi, Bluetooth, Ethernet, . . . ), a bus interface (any of USB, Firewire, . . . ), a wide area network interface (any of xDSL, FFTx, . . . ). More generally, any network interface compatible with any network allowing to send and receive data may be compatible with the present disclosure.

According to embodiments, the network interface may be coupled to a processing module 74, configured to obtain data (e.g., any of an image, a voice record) from a sensor (e.g., any of a camera and a microphone) when a user is near the processing device 7. For example, the processing module 74 may be configured to obtain a set of features based on the obtained (e.g., captured) data. For example, the processing module 74 may be configured to associate the second device with the processing device 7 on a condition that it is determined by the processing module 74 that the information element is associated with the second device and that the data (e.g., any of the image the voice record) of the user is associated with the user identifier. For example, the processing module 74 may be configured to associate the second device with the processing device 7 on a condition that it is determined by the processing module 74 that the authentication element is verified based on a verification element, that the credentials correspond to initial credentials associating the second device with the user identifier, and that the set of features matches an initial set of features, wherein the verification element, the initial credentials and the initial set of features may have been initially associated together in the processing device 7.

According to embodiments, the sensor (e.g., any of the camera, the microphone) may be internal or external to the processing device 7.

According to embodiments, the processing device 7 may also include means 78 to interact with a user, such as for example any of a display screen, a touch screen, a remote control, a keyboard, . . . .

Figure 8:
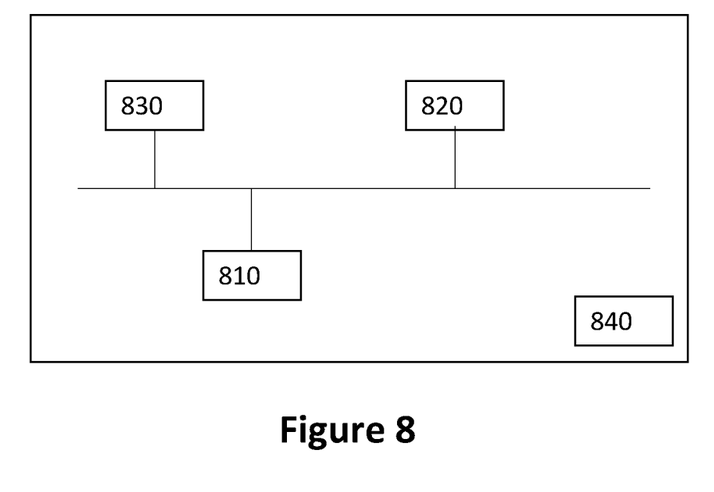
FIG. 8 represents an exemplary architecture of the processing device of FIG. 7 according to an embodiment.

FIG. 8 represents an exemplary architecture of the processing device of FIG. 7 according to an embodiment. The processing device may comprise one or more processor(s) 810, which is(are), for example, a CPU, a GPU and/or a DSP (English acronym of Digital Signal Processor), along with internal memory 820 (e.g. RAM, ROM, EPROM, EMMC). The processing device may comprise one or several Input/Output interface(s) 830 adapted to send output information and/or to allow a user to enter commands and/or data (e.g. a keyboard, a mouse, a touchpad, a webcam, a display), and/or to send/receive data over a network interface; and a power source 840 which may be external to the processing device.

According to an exemplary and non-limiting embodiment, the processing device may further comprise a computer program stored in the memory 820. The computer program may comprise instructions which, when executed by the processing device, in particular by the processor(s) 810, make the processing device carrying out the processing method described with reference to FIG. 7. According to a variant, the computer program may be stored externally to the processing device on a non-transitory digital data support, e.g. on an external storage medium such as a SD Card, HDD, CD-ROM, DVD, a read-only and/or DVD drive and/or a DVD Read/Write drive, all known in the art. The processing device may comprise an interface to read the computer program. Further, the processing device could access one or more Universal Serial Bus (USB)-type storage devices (e.g., "memory sticks.") through corresponding USB ports (not shown).

Figure 10:
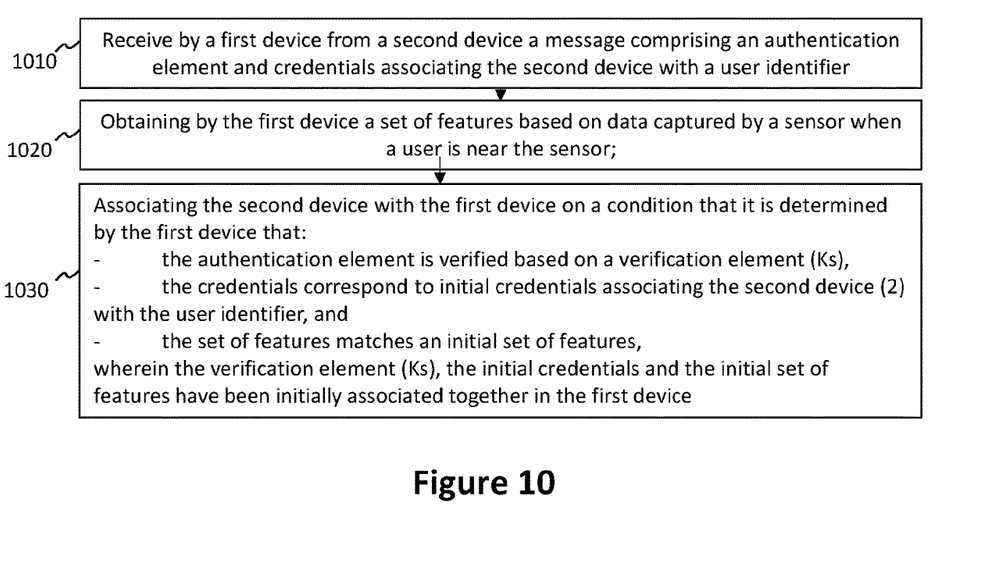
FIG. 10 is a diagram illustrating an example of a method for associating a first device with a second device.

According to embodiments, the processing device is a device, which may belong to a set comprising:
- a TV set;
- a game console;
- a media player;
- a head mounted device;
- smart glasses;
- a smart phone;
- a tablet;
- a laptop computer;
- a desktop computer;

FIG. 10 is a diagram illustrating an example of a method for associating a first device with a second device. According to embodiments, in a step 1010, a message may be received by the first device from the second device (2). The message may comprise an authentication element and credentials associating the second device (2) with a user identifier. In a variant, the message may be received by the first device after the second device may have been unlocked based on at least a part of the credentials.

In a step 1020, a set of features may be obtained by the first device based on data captured by a sensor when a user is near the sensor, the sensor being coupled to the first device. In a variant, the set of features may comprise first features extracted from at least one picture of the user. In a variant, the set of features may comprise second features extracted from a voice record of the user.

In a step 1030, the second device may be associated with the first device on a condition that it may be determined by the first device that the authentication element may be verified based on a verification element, that the credentials may correspond to initial credentials associating the second device with the user identifier, and that the set of features may match an initial set of features, wherein the verification element, the initial credentials and the initial set of features may have been initially associated together in the first device in an initial association. In a variant, the verification element may be a public key.

In a variant, the initial association may comprise receiving (32) by the first device an association request message from the second device. In a variant, the initial association may further comprise sending by the first device a first association information to the second device. For example, the first association information may be derived from the association request message. In a variant, the initial association may further comprise displaying by the first device a second association information, that may be derived from the association request message. In a variant, the initial association may further comprise receiving by the first device an initial message, that may comprise the initial credential and the verification element. For example, the initial credentials may be based on the first association information and on the second association information. In a variant, the second association information may be any of a set of digits and a quick response (QR) code. In a variant, the initial association may further comprise obtaining the set of initial features by the first device based on initial data captured by the sensor when the user is near the sensor. In a variant, the initial set of features may comprise first initial features extracted from at least one initial picture of the user.

In a variant, the initial set of features may comprise second initial features extracted from an initial voice record of the user.

While not explicitly described, the present embodiments may be employed in any combination or sub-combination. For example, the present embodiments are not limited to the described variants, and any arrangement of variants and embodiments can be used. Besides, any characteristic, variant or embodiment described for a method is compatible with an apparatus comprising means for processing the disclosed method, with a device comprising a processor configured to process the disclosed method, with a computer program product comprising program code instructions and with a non-transitory computer-readable storage medium storing program instructions.

The invention claimed is:

1. A method comprising:
receiving by a television from a smartphone an authentication element and second credentials associating the smartphone with a user identifier, wherein the authentication element and the second credentials are received in a second single message, and wherein the authentication element comprises a signature of at least a part of the second credentials, to be verified according to a public key;
receiving by the television a second set of features based on data captured by a sensor of the television when a user is near the television; and
associating the smartphone with the television in response to determining, by the television that:
the authentication element is verified based on the public key, wherein the verified authentication element indicates that the smartphone is trusted,
the second credentials correspond to first credentials associating the smartphone with the user identifier, and
the second set of features matches a first set of features,
wherein the first credentials have been received by the television from the smartphone together with the public key in a first single message prior to receiving the authentication element and second credentials from the smartphone in the second single message, and wherein the public key, the first credentials and the first set of features have been initially associated with each other in the television.

2. The method according to claim 1, wherein the authentication element and the second credentials are received by the television after the smartphone has been unlocked, wherein the second credentials include at least one of a secret code, fingerprint recognition, and face recognition being used for unlocking the smartphone.

3. The method according to claim 1, wherein the second set of features comprises second features extracted from any of at least one picture of the user and a voice record of the user.

4. The method according to claim 1, wherein said initial association further comprises obtaining the first set of features by the smartphone based on first data captured by the sensor when the user is near the sensor.

5. The method according to claim 4, wherein the first set of features comprises first features extracted from any of at least one initial picture of the user and an initial voice record of the user.

6. The method of claim 1, wherein the public key and the first credentials have been initially associated together based on the first credentials being a function of a first association information previously sent to the smartphone by the television and second association information previously displayed by the television.

7. The method of claim 6, wherein the first association information and the second association information have been derived by the television from an association request message previously received by the television from the smartphone.

8. The method of claim 6, wherein the function is pre-configured in the television.

9. A non-transitory computer storage medium comprising instructions which, when executed by a computer, cause the computer to carry out a method according to claim 1.

10. An apparatus comprising, a sensor and a processor configured to:
receive, from a second device an authentication element and second credentials associating the second device with a user identifier, wherein the authentication element and the second credentials are received in a second single message, and wherein the authentication element comprises a signature of at least a part of the second credentials, to be verified according to a public key;
receive, a second set of features based on data captured by the sensor when a user is near the apparatus; and
associate the second device with the apparatus in response to a determination by the apparatus that:
the authentication element is verified based on the public key, wherein the verified authentication element indicates that the second device is trusted,
the second credentials correspond to first credentials associating the second device with the user identifier, and
the second set of features matches a first set of features, wherein the first credentials have been received by the apparatus from the second device together with the public key in a first single message prior to receiving the authentication element and second credentials from the second device in the second single message, and wherein the public key, the first credentials and the first set of features have been initially associated with each other in the apparatus.

11. The apparatus according to claim 10, wherein the authentication element and the second credentials are received after the second device has been unlocked, wherein the second credentials include at least one of a secret code, fingerprint recognition, and face recognition being used for unlocking the second device.

12. The apparatus according to claim 10, wherein the second set of features comprises second features extracted from any of at least one picture of the user and a voice record of the user.

13. The apparatus according to claim 10, the processor further configured to obtain the first set of features based on first data captured by the sensor when the user is near the apparatus.

14. The apparatus of claim 10, wherein the public key and the first credentials have been initially associated together based on the first credentials being a function of a first association information previously sent to the second device by the apparatus and second association information previously displayed by the apparatus.

15. The apparatus of claim 14, wherein the first association information and the second association information have been derived by the apparatus from an association request message previously received by the apparatus from the second device.

16. The apparatus of claim 14, wherein the function is pre-configured in the apparatus.

* * * * *